United States Patent [19]

Dayley

[11] Patent Number: 5,306,133
[45] Date of Patent: Apr. 26, 1994

[54] DOUGH SHEET ROTARY CUTTING SYSTEM

[75] Inventor: Kyle E. Dayley, Rigsby, Id.

[73] Assignee: Miles J. Willard, Idaho Falls, Id.

[21] Appl. No.: 7,322

[22] Filed: Jan. 21, 1993

[51] Int. Cl.$^5$ .................................... A21C 11/12
[52] U.S. Cl. .................................... 425/217; 83/932;
264/155; 425/290; 425/294; 425/298; 425/308;
426/503; 426/518
[58] Field of Search ............... 425/215, 216, 217, 294,
425/296, 297, 298, 299, 308, DIG. 46, 403.1,
290, 291, 404; 264/148, 149, 153, 154, 155, 156;
426/503, 512, 518; 83/932

[56] References Cited

U.S. PATENT DOCUMENTS

| | | | |
|---|---|---|---|
| 170,460 | 11/1875 | Ashbourne | 425/298 |
| 1,088,070 | 2/1914 | Haines | 30/130 |
| 1,457,555 | 6/1923 | Skruggs | 428/615 |
| 2,618,852 | 11/1952 | Clough | 425/503 |
| 2,799,929 | 7/1957 | Kurianski | 30/301 |
| 3,024,112 | 3/1962 | Burgess | 425/503 |
| 4,075,359 | 2/1978 | Thulin | 426/503 |
| 4,192,899 | 3/1980 | Roth | 426/503 |
| 4,398,176 | 6/1983 | Nenci | 425/308 |
| 4,551,337 | 11/1985 | Schmit et al. | 426/503 |
| 4,592,916 | 6/1986 | Akesson | 426/518 |
| 4,650,687 | 3/1987 | Willard et al. | 426/438 |
| 5,037,350 | 8/1991 | Richardson et al. | 426/518 |
| 5,162,119 | 11/1992 | Pappas et al. | 425/215 |

*Primary Examiner*—Khanh Nguyen
*Attorney, Agent, or Firm*—Hopkins, French, Crockett, Springer & Hoopes

[57] ABSTRACT

A dough-processing system for dividing a dough sheet into multiple separate portions and transporting each portion in a predetermined direction. A rotary cutter, having a multiplicity of cutting dies affixed thereon, divides the dough sheet. The cutting dies have an exterior peripheral cutting edge for cutting the linear dough sheet into two or more linear portions for further processing on standard conveyor systems and an interior peripheral cutting edge for cutting an interior portion from the snack-piece dough. The rotary cutter includes an internal helical auger rigidly affixed to an external cylindrical mandrill having first and second ends and having a multiplicity of cutting dies affixed thereon. The rotary cutter has an ever-increasing diameter funnel path for transporting the interior cut portion of the snack-piece dough into the interior of the rotary cutter and thereupon the helical auger transports it out to the side of the rotary cutter. Each cutting die has rotatable, compressible biasing springs affixed between the exterior peripheral cutting edge and the interior peripheral cutting edge for selectively ejecting first one portion and then another portion of the snack-piece dough out of the cutting die while not interfering with cutting or deforming the snack-piece dough.

1 Claim, 5 Drawing Sheets

DOUGH SHEET ROTARY CUTTING SYSTEM

BACKGROUND OF THE INVENTION

1. Field of the Invention

This invention relates to a dough-processing system and, in particular, to a dough-processing system having a rotary cutter for dividing a dough sheet into multiple separate portions and transporting each portion in a predetermined separate direction.

2. Description of the Prior Art

For some time now, dough-processing systems have been used for taking mixed dough ingredients and sheeting them to form a dough sheet which is then transported along a conveyor system for multiple processing steps, one of which is to utilize a rotary cutter to cut the dough sheet into predetermined shapes for cookies or snacks (See, for instance, U.S. Pat. No. 4,650,687 assigned to the same assignee as the present invention for a complete description of such a system). These systems normally cut the unitary dough sheet into a multiplicity of snack/cookie shapes and one or more web remnants, which then are separated for further processing of the snack-dough pieces. Heretofore it has been difficult to make the snack portions with an opening in the interior because of the difficulty of removing the hole dough from the interior and what to do with it when removed. For manual operation, of course, the operator can physically remove the hole-punching and scrap or recycle it. But for an automated operation with a rotary cutter, if the hole punching is picked up (a multiple pin arrangement has been tried), where can you place the hole punching by the time the rotary cutter completes a 360° rotation and must cut a second snack shape with a second hole? Dough sheet processing systems of the prior art then have an inherent limitation in that the dough exits the cutter in the linear direction of the transport conveyor, it not being known how to separate the dough and transport a quantity of it in another predetermined direction, such as would be necessary if a hole punching or other dough portion were desired to be removed from the snack piece. Accordingly, it would be desirable to have a dough-processing system for dividing a dough sheet into at least two separate quantities and removing and transporting one such quantity in a predetermined separate direction other than that of the main transport conveyor.

Another problem that must be overcome to produce a snack with an interior opening is a way to remove the snack piece dough from the cutter die. Cutting and removing the center hole at the same time as cutting the periphery of the snack produces a snack piece dough that is wedged or pinched between the inner and periphery cutting means. The more angles, points, and shape irregularities of the dough piece causes increased friction that prevents the release of the snack from the cutter die. For instance, the cutter die shown in FIG. 1, which is one of the shapes contemplated for production restricts release of the snack piece dough. To eject the snack-piece dough itself, a means must be found to remove the snack-piece dough from the cutter die without damaging it. Biasing means have been used in the prior art on dough sheet cutters (See, for instance, U.S. Pat. Nos. 2,799,929 issued to Kurianski; 170,460 issued to Ashbourne; and 1,088,070 issued to Haines). Skruggs U.S. Pat. No. 1,457,555 teaches a dough sheet rotary cutter with an ejector means for ejecting the web scrap between the cutter dies. Damage is inconsequential when ejecting web scrap. A normal, straight-forward biasing means on a rotary cutter, upon rotation and contact with the dough sheet, would dig into the snack-piece dough and damage, or worse, hang-up the dough piece requiring shutdown and manual cleaning of the cutting die. Accordingly, it would be desirable to have a programmable, flexible, biasing means for selectively biasing predetermined portions of snack-piece dough from a rotary cutter die at consecutive time frames in the cutting process so as not to interfere with cutting or deforming the snack-piece dough.

SUMMARY OF THE INVENTION

Briefly, the present invention is directed to a dough-processing system for dividing a dough sheet into at least two separate quantities and transporting each quantity in a predetermined separate direction. This is accomplished by a rotary cutter having a multiplicity of cutting dies affixed thereon. The cutting dies have an exterior peripheral cutting edge for cutting the linear dough sheet into multiple snack piece dough quantities for further processing on standard conveyor systems and an interior peripheral cutting edge for cutting an inner hole punching from the snack-piece dough. The rotary cutter further has a means for removing and transporting the inner hole punching of the snack-piece dough into the interior of the rotary cutter and thereupon out to the edge of the rotary cutter. The rotary cutter includes an internal helical auger affixed to an external cylindrical mandrel having first and second ends and having a cutting die geometry affixed thereon. The rotary cutter includes a path for transporting the inner hole punching portion of the snack-piece dough into the interior of the rotary cutter and thereupon the helical auger transports it out to the side of the rotary cutter. Rotatable, compressible biasing means are affixed between the exterior peripheral cutting edge and the interior peripheral cutting edge for selectively ejecting at consecutive time frames in the cutting process first one portion and then another portion of the snack-piece dough from the cutting die while not interfering with cutting or deforming the snack-piece dough portion. This rotatable, compressible biasing means may be foam rubber, a spring plate with or without combination with a helical spring, and as in the preferred embodiment a crest-to-crest, flat-wire, compressed spring. Whatever form is used for the biasing means, it is the location and orientation of the biasing means that allows it to selectively bias the snack piece dough.

Other objects, advantages, and capabilities of the invention will become apparent as the description proceeds.

BRIEF DESCRIPTION OF THE DRAWINGS

The invention may be better understood and further advantages and uses thereof may become more readily apparent when considered in view of the following detailed description of the exemplary embodiments, taken with the accompanied drawings, in which.

DETAILED DESCRIPTION OF THE PREFERRED EMBODIMENTS

Figure 1:
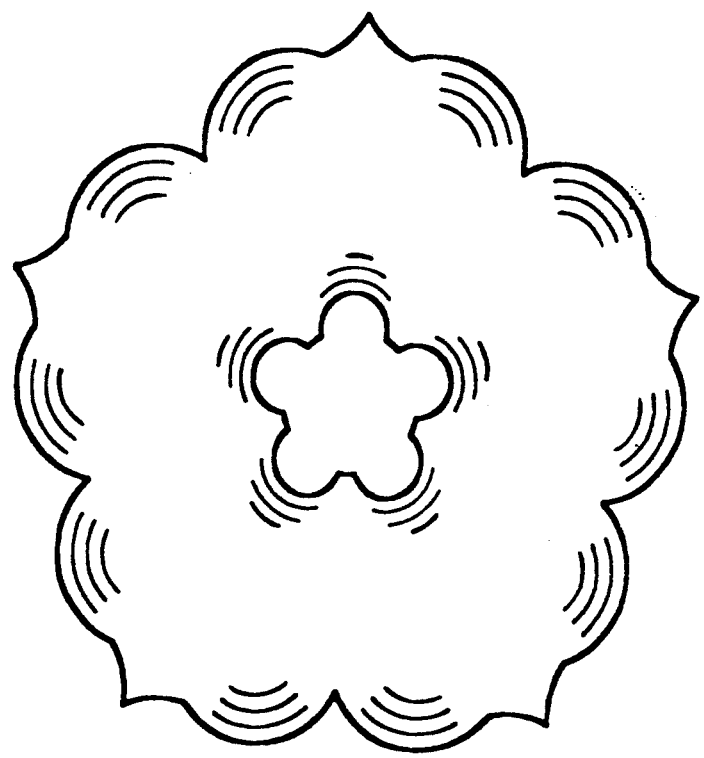
FIG. 1 is a plan view of a snack-cutting die having a potato flower-shaped design such as would be affixed to the face of a cylindrical mandrel according to the teachings of the invention.
Figure 2:
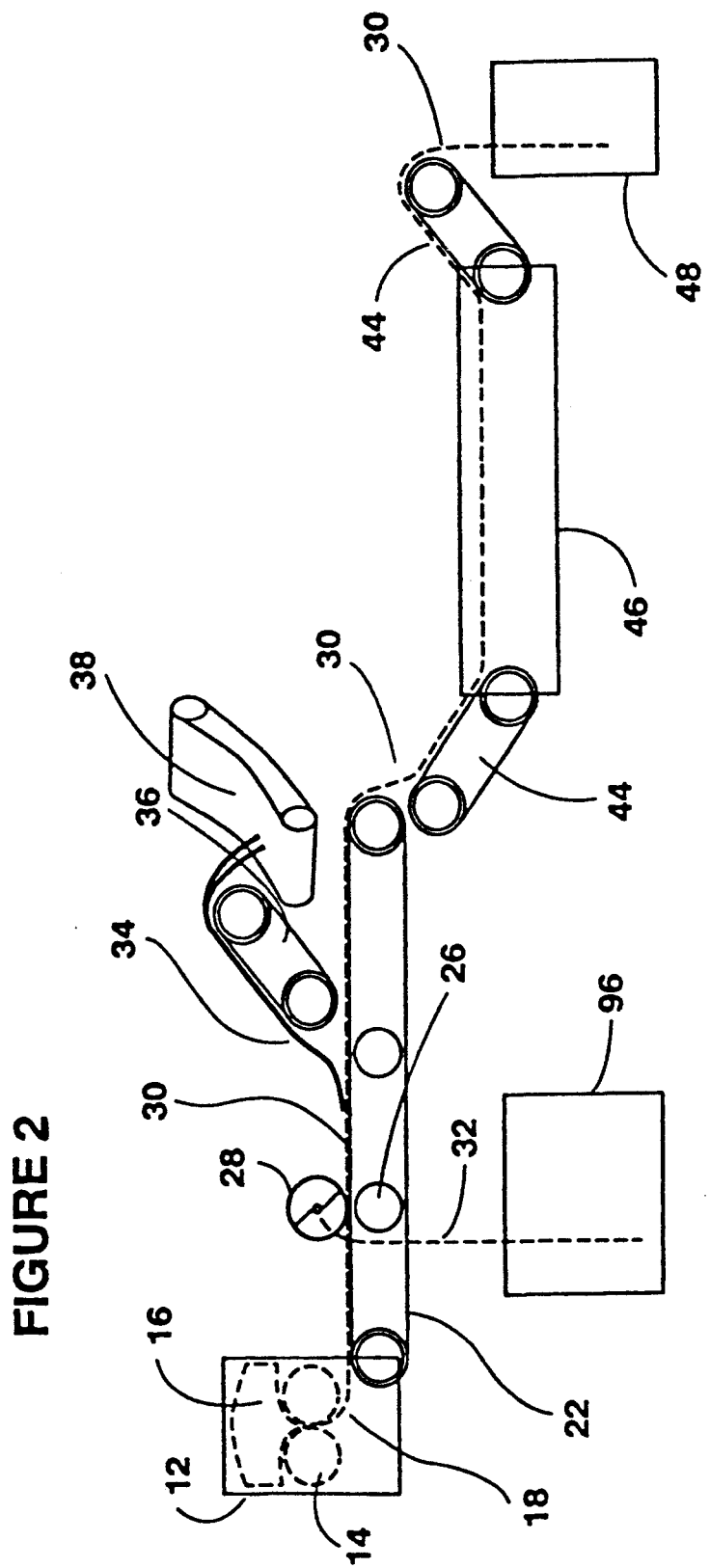
FIG. 2 is schematic view of a dough-processing system for dividing a dough sheet into at least two separate portions and transporting the portions in at least two predetermined separate directions.

Referring now to the drawings and to FIG. 2, in particular, there is shown a schematic view of a dough-processing system for dividing a dough sheet into two or more separate portions and transporting each portion in a predetermined separate direction. Dough-processing system 10 includes sheeter 12 having sheeting rollers 14 for taking premixed dough ingredients shown in phantom at 16 therebetween to form dough sheet 18 which proceeds down main conveyor 22 in a first predetermined direction past and between backup roller 26 and rotary cutter 28. Rotary cutter 28 divides dough sheet 18 into a multiplicity of snack-piece doughs 30, hole punchings 32 transported in a second predetermined direction, and one or more web scrap remnants 34, which are transported in a third predetermined direction by web conveyors 36 and 38 for eventual reclamation into another dough mix or scrap. Snack-piece doughs 30 minus hole punching 32 are transported in the first predetermined direction by main conveyor 22 and fryer conveyors 42 and 44 both into and out of fryer 46, respectfully, and into snack bin 48.

Figure 3:
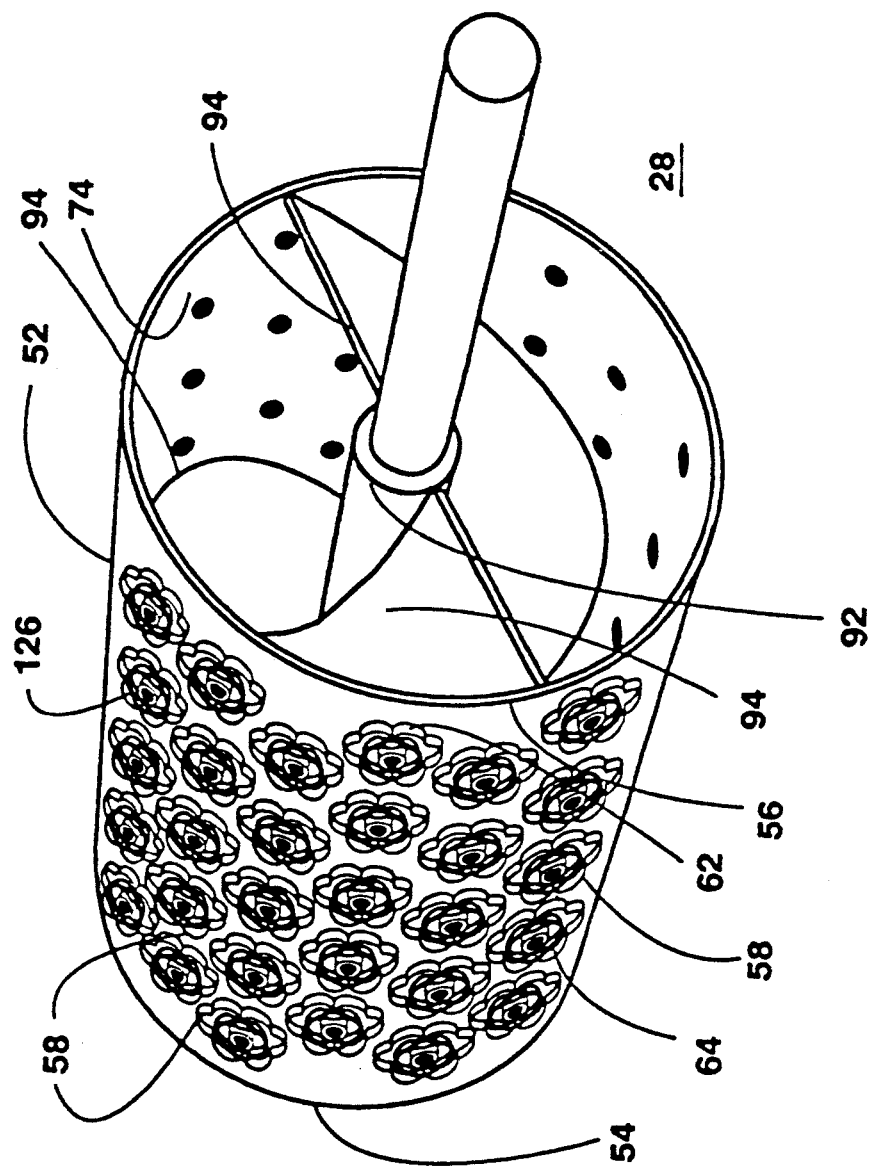
FIG. 3 is an isometric view of the rotary cutter of FIG. 2 constructed according to the teachings of the invention.
Figure 4:
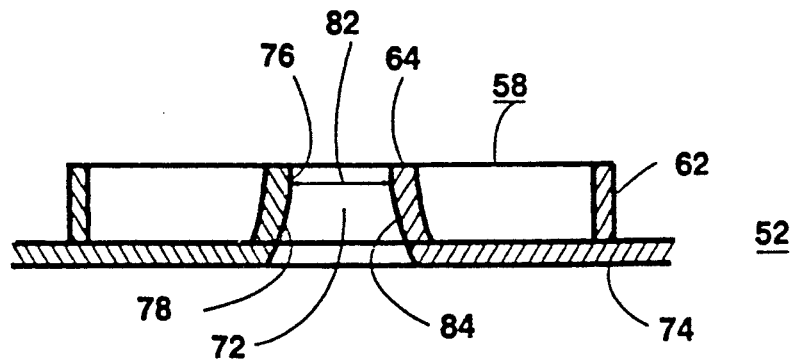
FIG. 4 is a cross-sectional view of the cutting die and the adjacent surface of the mandrel illustrating the path followed by the hole punching from the internal cavity through the cutting die and the mandrel.

Referring now to FIG. 3, there is shown an isometric view of the rotary cutter 28 of FIG. 2 constructed according to the teachings of the invention. Rotary cutter 28 includes cylindrical mandrel 52 having first and second ends 54 and 56, respectively, and a multiplicity of cutting dies 58 affixed thereon, which cutting dies 58 have a predetermined geometry of periphery cutting means 62 and interior hole-cutting means 64, respectively, for cutting out predetermined snack-shaped dough pieces with an internal hole cavity punched therein. The hole punching from this internal cavity proceeds through cutting die 58 and mandrel 52 along path 72 as may be seen better with reference to FIG. 4, wherein there is shown a cross-sectional view of cutting die 58 and the adjacent surface 74 of mandrel 52. Note that each side of path 72 has a short vertical segment 76 and a transverse segment 78 so as to form a holding receptacle 82 and an ever-increasing diameter funnel path 84 to the interior of cylindrical mandrel 52. In operation, when rotary cutter 24 is disposed for rotary cutting above dough sheet 18, as shown schematically in FIG. 2, upon first contact With dough sheet 18, a first hole punching is cut by internal hole-cutting means 64 and removed from main conveyor 22 by holding receptacle 82. Upon subsequent rotations when interior hole-cutting means 64 contacts dough sheet 18 a second, third, and subsequent times, the new internal hole punchings, which are removed from conveyor 22 by holding receptacle 82, then force the previous hole punchings through funnel path 84 into the interior of cylindrical mandrel 52.

Referring again now to FIG. 3, it can be readily understood that auger 92 is fixably attached to cylindrical mandrel 74 by welding, gluing, friction fit, etc. of auger flights 94 to the interior of cylindrical mandrel 52, and auger 92 transports the multiple hole punchings to either the first or second side 54 or 56, respectively, of cylindrical mandrel 52 depending on whether a right- or left-hand helical thread is utilized for auger flights 94. In this manner, hole punchings, such as punchings 32 of FIG. 2, may be removed from main conveyor 22 and transported along path 72 through mandrel surface 74 and then by auger 92 in the second predetermined direction separate from that of a main conveyor 22 to the sides of rotary cutter 28 whereupon they may be collected or transported by conveyor to a punch-collector bin such as shown generally at 96 in FIG. 2 for reclamation or scrap.

Figure 5:
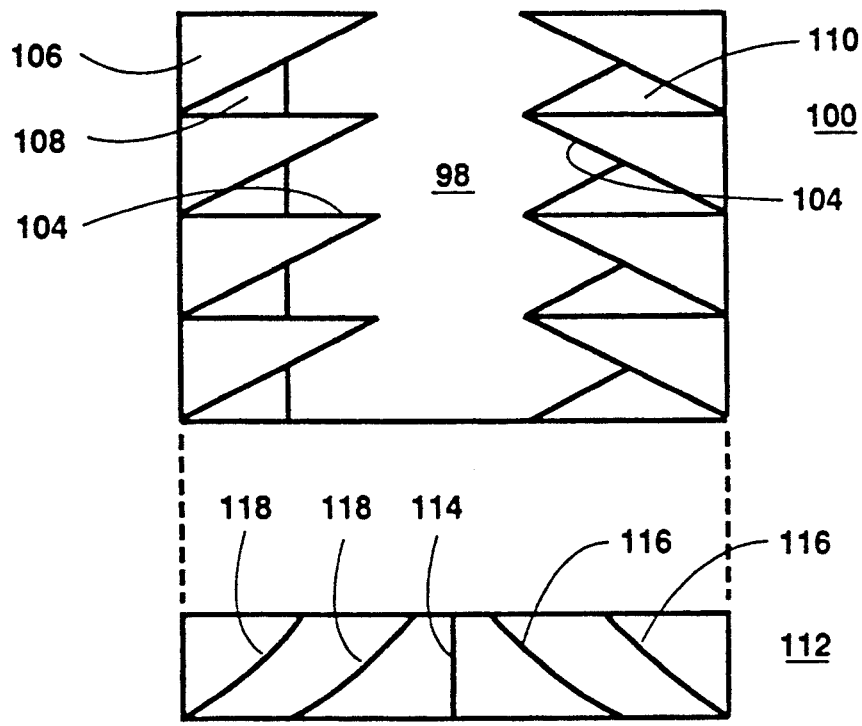
FIG. 5 is a schematic view of the cylindrical mandrel and internal auger of a rotary cutter constructed according to the teachings of the invention.

It can be readily understood then by those skilled in the art that rotary cutter 24 includes means disposed within rotary cutter 24 for removing one or multiple quantities of dough from a main conveyor and for transporting said quantities of dough in a predetermined separate direction from that of the main conveyor. These quantities of dough may represent more than just holes in a snack. For instance, referring now to FIG. 5, there is shown a schematic view of cylindrical mandrel 98 of a rotary cutter 100 constructed according to the teachings of the invention, such as what would be seen in a plan view if cylindrical mandrel 98 were opened flat, and a corresponding schematic view of an auger 112 which would be disposed within cylindrical mandrel 100. It can be seen that a predetermined geometry of cutters 104 mounted on mandrel 100 could cut large right-triangle snack-shaped doughs 106, small right-triangle snack-shaped doughs 108, and small equilateral triangle snack-shaped doughs 110. With suitable rotary cutter 100, constructed according to the teachings of the invention, snack shapes 106 would be left on the main conveyor and snack shapes 108 and 110 would be transported along suitable paths through mandrel 98 into the interior of the rotary cutter 100 as taught by the invention where auger 112 by means of center divider 114 and right-hand and left-hand flights 116 and 118, respectfully, would transport snack shapes 108 and 110, respectively, to the right- and left-hand sides of rotary cutter 100, which could be gathered in bins or placed on conveyors for further processing. In the manner, it can be readily seen that a conveyor option of the prior art and a rotary cutter constructed according to the teachings of the invention is capable of transporting predetermined, snack-piece doughs in first, second, and third separate directions for further processing.

Figure 6:
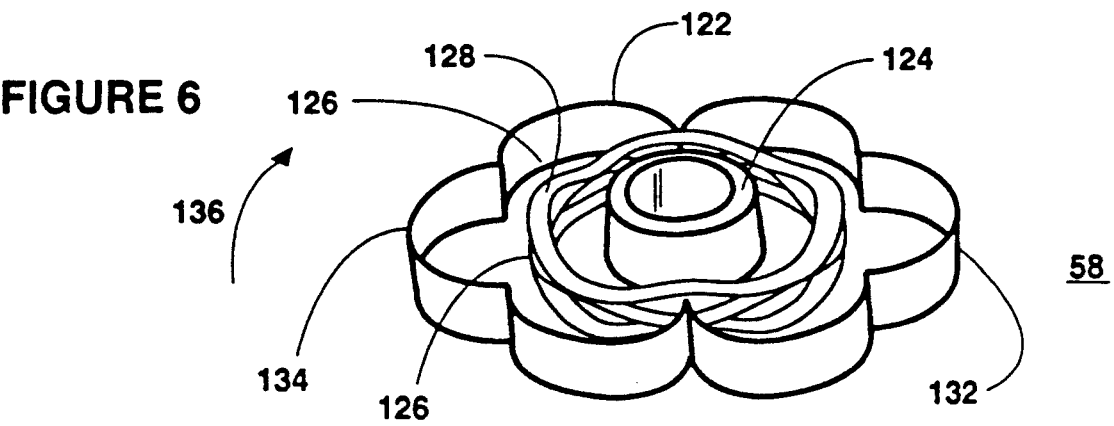
FIG. 6 shows an enlarged view of the cutting die of FIG. 3 for making a snack-piece dough with a hole punching within and a biasing means disposed thereon for selectively ejecting first one portion and then another portion of a snack piece dough out of the cutting die.

Referring now to FIG. 6, there is shown an enlarged view of cutting die 58 of FIG. 3 for making a snack-piece dough with a hole punching within. The hole punching is removed and transported by the rotary cutter as described above, but now we have an additional problem of removing the snack dough piece when cutting out such a shape with an interior cavity. Cutting die 58 includes periphery cutting means 122 and interior hole-cutting means 124. It can be readily appreciated that even for the simplified shape shown, the snack-piece dough has multiple corners and angles, and which, along with frictional contact along the sides of the periphery and interior hole-cutting means 122,124, respectfully, and especially the pinching action between them, cause the snack-piece doughs to hang-up within the cutting die 58. Rotatable, compressible, biasing means 126 is disposed within cutting die 120 for selectively ejecting first one portion and then another portion of the snack-piece dough out of the cutting die while not interfering with cutting nor deforming the chip. Rotatable, compressible, biasing means 126 may be a crest-to-crest flat wire compressed spring produced by the Smalley Steel Ring Company of Wheeling, Ill., but any rotatable, compressible, biasing means will suffice. A foam rubber biasing means and also a spring steel flat wire biasing means have been successfully used and are equally applicable. The important thing is that the biasing means be both rotatable and compressible and the location and orientation of the biasing means relative to the external periphery cutting means. At rest, top surface 128 of biasing means 126 is disposed so as to be at a lower elevation than the leading edge 132 of periphery cutting means 122 and higher in elevation than the trailing edge 134 of periphery cutting means 122. In this manner, when cutting die 120 is affixed to the cylindrical mandrel of a rotary cutter, turning in a clockwise direction as denoted by arrow 136, then in operation face 128 of biasing means 126 will contact and eject the dough as shown schematically in FIG. 7.

Figure 7:
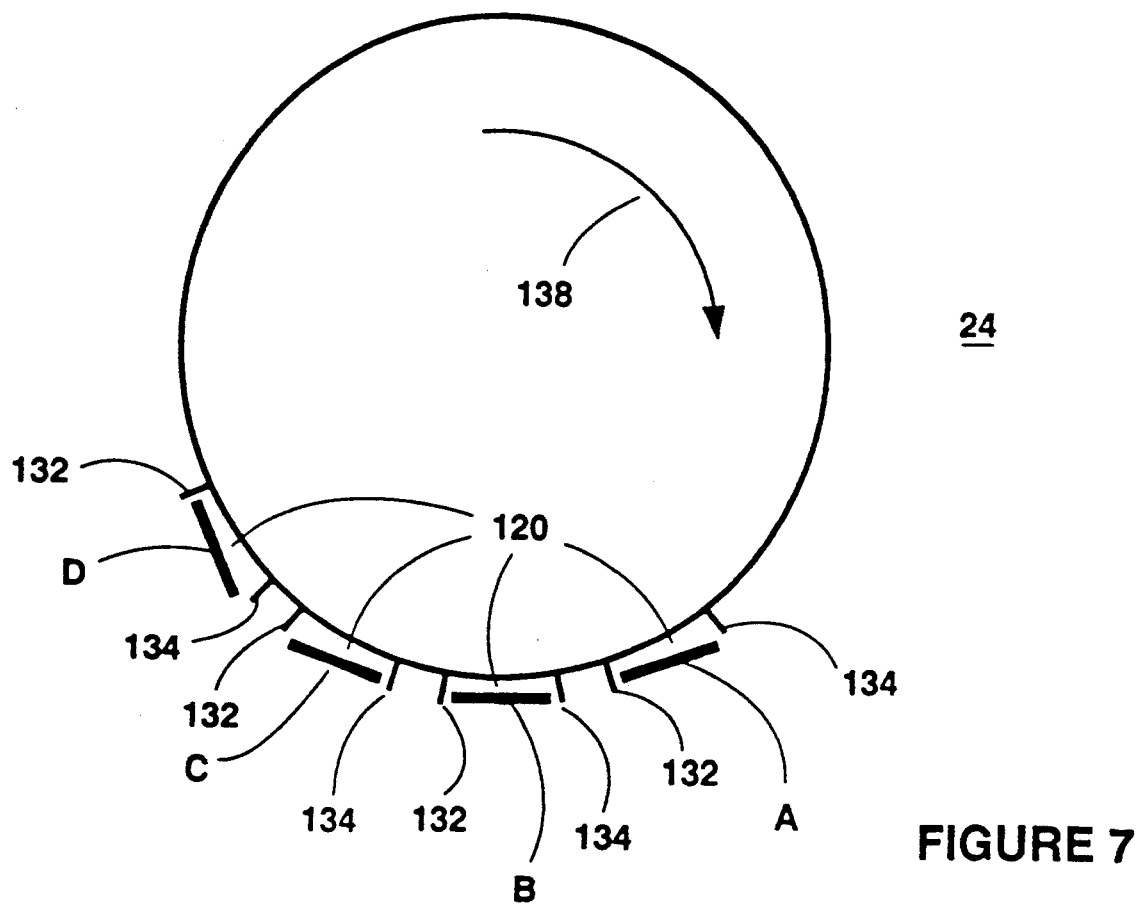
FIG. 7 is a schematic view of the movement of the top face of the biasing means of FIG. 6 when the cutting die is affixed to and in operation on a rotary cutter.

Referring now to FIG. 7, there is shown a schematic view of the movement of top face 128 of biasing means 126 when cutting die 120 is affixed to a rotary cutter. Face plate 128 is shown in four positions relative to the cylindrical mandrel of a rotary cutter, such as, for instance, rotary cutter 28 of FIG. 3, and also relative to the leading and trailing edge of typical cutting dies, such as, for instance, leading edge 132 and trailing edge 134 of cutting die 58 of FIG. 6, for clockwise rotation as denoted by arrow 138. Position "A" is when cutting die 122 has not contacted the dough sheet and it can be seen that the orientation of face plate 128 of biasing means 126 is disposed lower than leading edge 132 and higher than trailing edge 134 of cutting die 120. In position "B", rotary cutter 28 has rotated clockwise such that face plate 128 of biasing means 126 is now in full contact with the dough piece, the trailing edge of face plate 128 has been compressed, and face plate 128 is now in full contact with the dough piece. Position "C" denotes face plate 128 as leading edge 132 has rotated past the dough sheet, but trailing edge 134 is still in contact, so we see that the rotation of face plate 128 is its maximum position where it ejects a portion of a dough snack piece out of cutting die 120. In position "D" it can be seen that rotary cutter 28 has now rotated far enough such that cutting die 120 is not in contact with the dough sheet at all, and face plate 128 returns to its normal position wherein now the trailing portion of the snack piece would be biased out of cutting die 120. In this manner, the dough snack piece is selectively ejected from the cutter by ejecting first the leading portion and then the trailing portion of the dough snack piece in consecutive time frames because of the rotatable, compressible action of biasing means 126.

In conclusion, what has been disclosed is a dough-processing system for dividing a dough sheet into at least two separate quantities and transporting each quantity in a predetermined separate direction by means of a rotary cutter having a remove and transport means for removing a first quantity of the dough sheet, then transporting it into the interior of the rotary cutter and thereupon out to the edge of the rotary cutter by action of an internal auger. Another unique feature of the invention is the action of a rotatable, compressible biasing means for selectively ejecting first one portion and then another portion of a snack-dough piece out of a cutting die arrangement while not interfering with cutting or deforming the snack-piece dough. This unique function is brought about by both the action of the biasing means and by its location and orientation relative to the geometry of the cutting means location on the cylindrical mandrel of the rotary cutter of the invention.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A dough processing system for cutting a dough sheet into at least two separate quantities and transporting each respective quantity in a predetermined direction, comprising:
   (a) a main conveyor for transporting said dough sheet in a first predetermined direction;
   (b) a rotary cutter having a cylindrical mandrel with first and second ends with a predetermined geometry of cutters mounted thereon, each of said cutters having a predetermined periphery cutting means for producing a shaped dough piece and an interior hole-cutting means for producing an internal hole punching, said interior hole-cutting means including a path for said hole punching to proceed to an interior of said mandrel;
   (c) an auger disposed within said cylindrical mandrel for transporting said hole punching from an interior of said mandrel to a side of said mandrel when said mandrel rotates, wherein said rotary cuter cuts said dough sheet into multiple hole punchings, multiple shaped dough pieces, and at least one web scrap remnant; and
   (d) a transportation means further comprising the main conveyor for conveying said multiple shaped dough pieces in the first predetermined direction, the auger for conveying said hole punchings in a second predetermined direction, and a web conveyor for conveying at least one web scrap remnant in a third predetermined direction to a recycle or scrap bin.

* * * * *